United States Patent
Winkeler et al.

(10) Patent No.: US 7,237,013 B2
(45) Date of Patent: *Jun. 26, 2007

(54) NETWORK SYSTEM INCLUDING DATA SOCKET COMPONENTS FOR ACCESSING INTERNET SEMAPHORES

(75) Inventors: Keith E. Winkeler, Cedar Park, TX (US); Paul F. Austin, Austin, TX (US)

(73) Assignee: National Instruments Corporation, Austin, TX (US)

( * ) Notice: Subject to any disclaimer, the term of this patent is extended or adjusted under 35 U.S.C. 154(b) by 745 days.

This patent is subject to a terminal disclaimer.

(21) Appl. No.: 09/835,987

(22) Filed: Apr. 16, 2001

(65) Prior Publication Data

US 2002/0152280 A1 Oct. 17, 2002

(51) Int. Cl.
*G06F 15/16* (2006.01)

(52) U.S. Cl. .............. 709/217; 709/218; 709/219; 709/223; 709/224; 709/225; 709/226; 709/229; 709/248; 707/8; 707/9; 718/102; 718/104

(58) Field of Classification Search .......... 718/104, 718/102; 711/152, 15, 163, 169; 709/216–218, 709/223–226, 229, 248; 707/8, 9
See application file for complete search history.

(56) References Cited

U.S. PATENT DOCUMENTS

| 4,642,758 A * | 2/1987 | Teng ..................... 707/10 |
| 5,706,507 A | 1/1998 | Schloss |
| 5,717,954 A * | 2/1998 | Grieff et al. ............... 710/57 |
| 5,774,664 A | 6/1998 | Hidary et al. |
| 5,878,219 A | 3/1999 | Vance, Jr. et al. |
| 5,890,172 A | 3/1999 | Borman et al. |
| 5,974,416 A | 10/1999 | Anand et al. |
| 5,978,817 A | 11/1999 | Giannandrea et al. |
| 6,014,674 A * | 1/2000 | McCargar ................. 707/202 |
| 6,041,360 A | 3/2000 | Himmel et al. |
| 6,061,749 A * | 5/2000 | Webb et al. ................ 710/65 |
| 6,076,733 A | 6/2000 | Wilz, Sr. et al. |

(Continued)

OTHER PUBLICATIONS http://developer.novell.com/research/devnotes/1990/October/04/08.htm; pp. 1-5.*

*Primary Examiner*—Bharat Barot
*Assistant Examiner*—Shawki Ismail
(74) *Attorney, Agent, or Firm*—Meyertons Hood Kivlin Kowert & Goetzel, P.C.; Jeffrey C. Hood

(57) ABSTRACT

An improved method and system for accessing data from a semaphore in a computer system, through the use of a software component in an application. The method may involve multiple software components in a corresponding multiple of applications in a corresponding multiple of computer systems. In that case, one or more requests to perform a locked read-modify-write operation on the data comprised in the semaphore may be received from one or more of the multiple software components. When multiple requests are received, the multiple requests may be stored in a queue, and processed sequentially. The corresponding multiple of applications may use the semaphore to synchronize operation of the applications. The multiple of computer systems and the computer memory may be connected through a network (e.g., the Internet). Accessing data from a semaphore in a computer system may include publishing or writing data to the semaphore.

31 Claims, 13 Drawing Sheets

U.S. PATENT DOCUMENTS

| | | | |
|---|---|---|---|
| 6,094,684 A | 7/2000 | Pallmann | |
| 6,101,510 A | 8/2000 | Stone et al. | |
| 6,119,153 A | 9/2000 | Dujari et al. | |
| 6,138,150 A | 10/2000 | Nichols et al. | |
| 6,161,146 A * | 12/2000 | Kley et al. | 709/248 |
| 6,163,779 A | 12/2000 | Mantha et al. | |
| 6,175,862 B1 | 1/2001 | Chen et al. | |
| 6,237,019 B1 * | 5/2001 | Ault et al. | 718/104 |
| 6,370,569 B1 * | 4/2002 | Austin | 709/217 |
| 6,377,952 B1 * | 4/2002 | Inohara et al. | 707/101 |
| 6,405,233 B1 * | 6/2002 | Mathews et al. | 708/670 |
| 6,414,687 B1 * | 7/2002 | Gibson | 345/503 |
| 6,519,623 B1 * | 2/2003 | Mancisidor | 718/100 |
| 6,654,754 B1 * | 11/2003 | Knauft et al. | 707/100 |
| 6,745,274 B1 * | 6/2004 | Snyder et al. | 710/240 |
| 6,748,470 B2 * | 6/2004 | Goldick | 710/200 |
| 6,754,799 B2 * | 6/2004 | Frank | 711/216 |
| 6,801,911 B1 * | 10/2004 | Berstis | 707/10 |
| 6,898,687 B2 * | 5/2005 | Wu et al. | 711/173 |
| 6,920,507 B1 * | 7/2005 | Kley et al. | 709/248 |
| 7,003,521 B2 * | 2/2006 | Long | 707/8 |
| 7,043,529 B1 * | 5/2006 | Simonoff | 709/205 |
| 2002/0194346 A1 * | 12/2002 | Talanis | 709/227 |
| 2006/0173951 A1 * | 8/2006 | Arteaga et al. | 709/203 |

* cited by examiner

NETWORK SYSTEM INCLUDING DATA SOCKET COMPONENTS FOR ACCESSING INTERNET SEMAPHORES

BACKGROUND OF THE INVENTION

1. Field of the Invention

The present invention relates generally to the field of networking and semaphores, and more particularly to the use of a data socket component to maintain and/or access a semaphore, wherein various devices may use the semaphore for synchronization or control for various purposes.

2. Description of the Related Art

In modern networked computer systems, the computer system may be required to obtain data from various sources, including a semaphore. The semaphore may be comprised in local memory on the computer system, a memory of a second computer system, external data sources connected to the computer system, such as I/O devices connected to computer system ports, and/or other networked computer systems, such as computer systems connected to a LAN, WAN or to the Internet. When a program executing on a computer system is required to access data, such as from a semaphore, the program is often required to account for the source or location of the data, opening and closing of files, the format of the data, and conversion of the data to readable formats, among others.

One of the biggest challenges in developing complex applications that are comprised of different components is sharing and exchanging information and data between the different components. One method for sharing or exchanging information between different components is by using a semaphore. As defined herein, the term "semaphore" is intended to include a memory location containing data that is used to enable two or more programs to share information and/or synchronize operations. A semaphore may be used for various purposes, such as management of a shared resource, such that the different components are aware of the level of the shared resource that is available to the different components, over time. For example, a user may use a semaphore to restrict access to a communications channel to a limited number of threads so that each thread has sufficient bandwidth. As another example, two or more programs may use a semaphore to increment or decrement the count of the use of a certain resource. A semaphore may also include or store other types of "synchronization objects", such as a mutex or a queue.

Today, the task of exchanging data between different applications or components is solved using a number of different existing tools, including writing and reading files, DDE, ActiveX automation, http server and client tools, and more. In addition, measurement applications, as well as other engineering applications, often place some special requirements on sharing data, such as providing additional information qualifying the data.

Hence, an improved system and method is desired for providing programs with access to data from semaphores, wherein the data may have various types or formats, wherein the access is provided invisibly to the user or programmer, and wherein the data is returned in a format useable by the application accessing the semaphore.

SUMMARY OF THE INVENTION

The present invention provides various embodiments of an improved method and system for accessing data from a semaphore in a computer system, preferably through the use of a software component comprised in the application. In one embodiment, the method involves including a first software component (referred to as a data socket component) in a first application, where the first software component is operable to access data from the semaphore. The data comprised in the semaphore may be of a first data type of a plurality of different possible data types. The first application may be executed, and may invoke the first software component when the semaphore is desired to be accessed. The first software component may access the semaphore using location information of the semaphore (e.g., a uniform resource locator (URL) specifying a location of the semaphore). The first software component may access the data comprised in the semaphore and may convert the data into a format useable by the first application after the first software component receives the data. The first application may receive and process the data after the data is converted. The accessing, conversion and processing of the data may be performed a plurality of times. Additionally, the accessing, conversion and processing of the data may be performed without any user programming required. The first software component may perform a locked read-modify-write operation on the data comprised in the semaphore. Accessing the data comprised in the semaphore may include the following steps, performed by the first software component: locking the semaphore, reading the data comprised in the semaphore, writing new data to the semaphore, and unlocking the semaphore.

In a typical embodiment, the method may involve a plurality of applications in a corresponding plurality of computer systems, where each of the applications share or use a semaphore for communication and/or data exchange. Each of the applications may include a software component, such as a data socket client. In this typical embodiment, one or more requests to perform a locked read-modify-write operation on the data comprised in the semaphore may be received from one or more of the multiple software components. When multiple requests are received, the plurality of requests may be stored in a queue, and processed sequentially. The corresponding multiple of applications may use the semaphore to synchronize operation of the applications or otherwise provide communication between the applications. The multiple of computer systems and the computer memory may be connected through a network (e.g., the Internet). Accessing data from a semaphore in a computer system may include publishing or writing data to the semaphore as well as reading data from the semaphore.

BRIEF DESCRIPTION OF THE DRAWINGS

A better understanding of the present invention can be obtained when the following detailed description of several embodiments is considered in conjunction with the following drawings, in which.

DETAILED DESCRIPTION OF SEVERAL EMBODIMENTS

Incorporation by Reference

The following references are hereby incorporated by reference as though fully and completely set forth herein.

U.S. application Ser. No. 09/185,161 titled "Data Socket System and Method for Accessing Data Sources Using URLs" and filed Nov. 3, 1998, whose inventor is Paul F. Austin.

U.S. application Ser. No. 09/374,740 titled "System and Method for Automatically Creating URLs for Accessing Data Sources and Data Targets" and filed Aug. 13, 1999, whose inventors are Paul F. Austin, David W. Fuller, Brian H. Sierer, Kurt Carlson, Stephen Rogers and Chris Mayer.

U.S. application Ser. No. 09/546,047 titled "System and Method for Connecting to and Viewing Live Data using a Standard User Agent" and filed Apr. 10, 2000, whose inventor is Paul F. Austin.

Figure 1A:
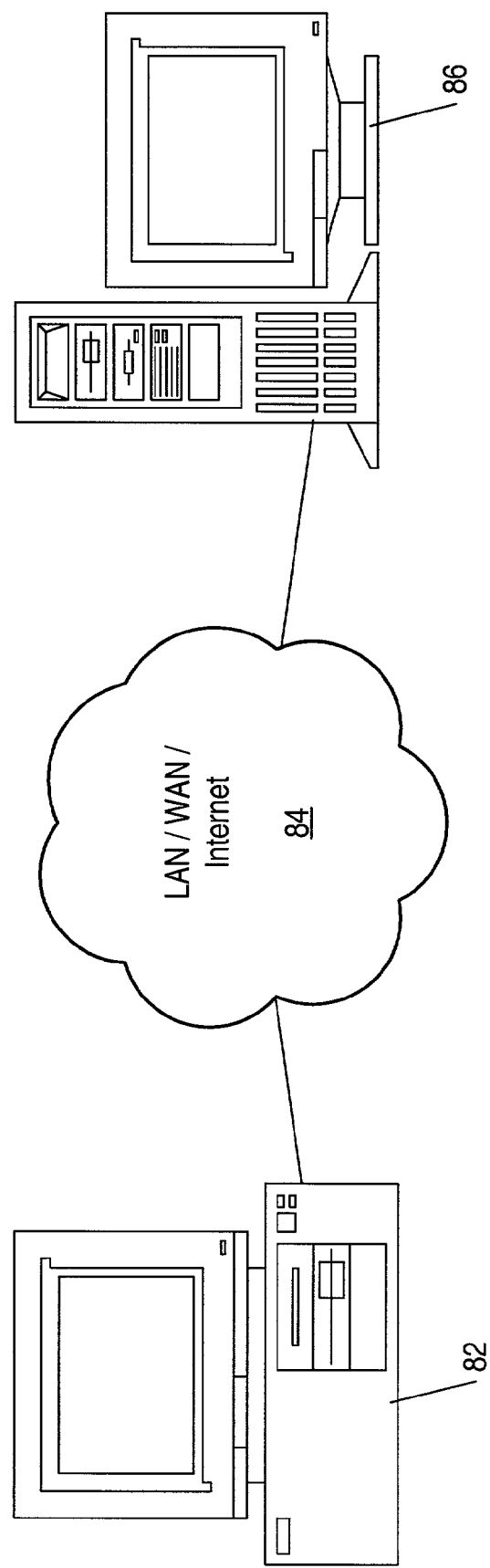
FIG. 1A illustrates a first computer system connected through a network to a second computer system.

FIG. 1A: First and Second Computer Systems Connected through a Network

FIG. 1A illustrates a first computer system 82 connected through a network 84 to a second computer system 86. The first computer system 82 and the second computer system 86 can be any of various types, as desired. The network 84 can also be any of various types, including a LAN (local area network), WAN (wide area network), or the Internet, among others.

Although one instance of the first computer system 82 and one instance of the second computer system 86 is shown, multiple instances (i.e., computer system 82*a*, computer system 82*b*, computer system 82*c*, etc., or computer systems 86*a*, 86*b*, 86*c*, etc.) may exist. Description regarding the first computer system 82 and the second computer system 86 may equally apply to each instance of computer system 82*x* or 86*x* (e.g., instances 82*a*, 82*b*, 82*c*, 86*a*, 86*b*, 86*c* etc., may each include or store software according to one embodiment of the present invention).

The first computer system 82 and the second computer system 86 may each store an application program (or a plurality of application programs), wherein the application program(s) on each computer may use a semaphore to communicate with each other, synchronize operations, or otherwise share data. One or more of the first computer system 82 or the second computer system 86, or another computer (not shown) may store the semaphore that is used by the respective application programs.

The first computer system 82 and/or second computer system 86 may each include or store a first software component, preferably a data socket client (or data socket component), according to one embodiment of the present invention. Applications executing in the first computer system 82 and the second computer system 86 are each operable to use their respective data socket client according to the present invention to access data located in the semaphore. The first software component may be any of various types of software components that are operable to connect, access, and/or convert data located in a semaphore. The first software component may be integrated with a respective application, or may be a separate software component or software object. In the preferred embodiment, the first software component is a data socket client as described in U.S. patent application Ser. No. 09/185,161. In the following description, an embodiment of the present invention is described using a data socket client as the first software component.

The semaphore may be located locally on the first computer system 82, or the semaphore may be located in another computer, e.g., computer 86, connected through the network. Thus the data socket client provides access to data stored and/or located in various manners. For example, the data socket client may provide access to data located in the local system memory or non-volatile memory of the respective computer system in which the data socket client is located, or a memory of a second computer system or other device.

The data socket client also may provide access to data stored in or generated by peripheral devices connected to the first computer system 82, such as peripheral devices connected to the computer's serial port, e.g., the RS-232 port, RS-485 port, a USB (Universal Serial Bus) port, an IEEE 1394 port, or an IEEE 1394.2 port, etc. The data socket client also provides access to data stored in or generated by peripheral devices connected to the parallel port of the first computer system 82. The data socket client also provides access to data stored in or generated by peripheral devices connected to a bus of the first computer system 82, such as the PCI (Peripheral Component Interconnect) bus, the ISA (Industry Standard Architecture) bus, and the NuBus, among others. Examples of these peripheral devices include instrumentation devices, industrial automation devices, process control devices, multimedia devices, e.g., video and/or audio devices, etc.

As noted above, the data socket client also provides access to data stored in or generated by computers or devices connected to the first computer system 82 through the network 84, such as the second computer system 86. As also noted above, the network 84 can be any of various types, including a LAN (local area network), such as an Ethernet network, or a WAN (wide area network), or the Internet, among others.

Thus the data socket client enables access to data stored locally on or proximate to the first computer system 82 as well as data stored in a second computer system or device 86 connected through any of various types of networks 84 to the first computer system 82. The data socket client provides this data access invisibly to the user, i.e., the user is not required to create program code to access the data, open or close files, or handle data format conversions.

The data socket client is preferably a re-useable software component, such as a software control or software object, e.g., an Active X control, Java object, C++ object, etc. The data socket client may also take other forms, such as a LabVIEW Virtual Instrument (VI), a Simulink diagram, a DLL, or others.

The first computer system 82 may include a computer memory which stores one or more semaphores. Similarly, the second computer system 86 may also include a computer memory which stores one or more semaphores. Thus either the first computer system 82 or the second computer system 86 may read data from a semaphore and/or write data to a semaphore, for purposes of synchronization of various processes and/or control of various processes. Effectively, the first computer system 82 and the second computer system 86 may communicate through a semaphore located or stored in a computer memory on either the first computer system 82 or the second computer system 86, or stored on a different computer system.

Figure 1B:
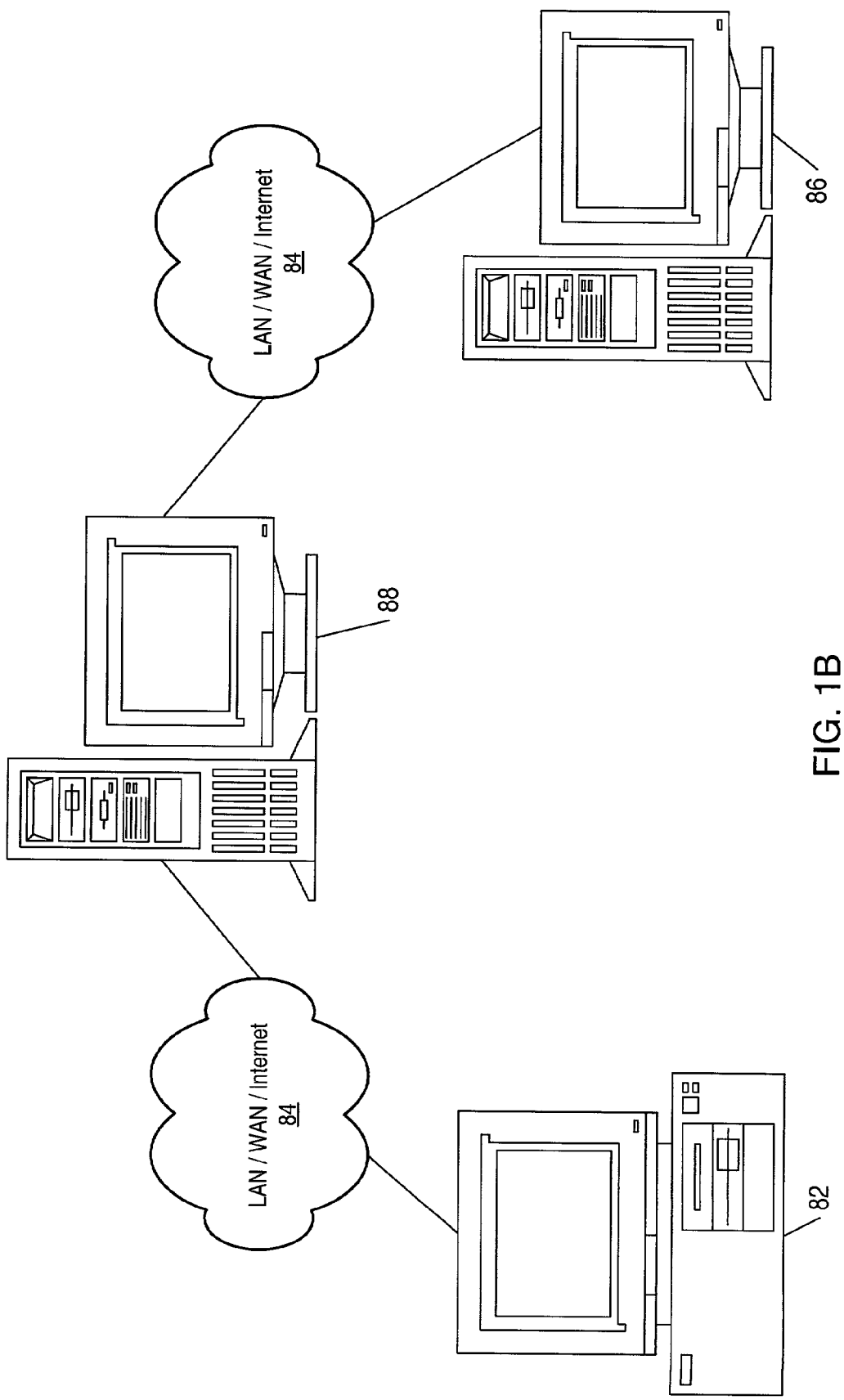
FIG. 1B illustrates the first computer system and the second computer system of FIG. 1A connected through a network to a third computer system.

FIG. 1B: First, Second, and Third Computer Systems Connected through a Network

FIG. 1B illustrates an alternate embodiment of FIG. 1A. FIG. 1B illustrates a first computer system 82, a second computer system 86, and a third computer system 88 connected through the network 84. The first computer system 82, the second computer system 86, and the third computer system 88 can be any of various types, as desired. The network 84 can also be any of various types, including a LAN (local area network), WAN (wide area network), or the Internet, among others.

In this exemplary embodiment, the first computer system 82 and the second computer system 86 may each store an application program, wherein the application programs on each computer 82 and 86 may use a semaphore to communicate with each other, synchronize operations, or otherwise share data. The third computer system 88 may include a computer memory which stores one or more semaphores. The semaphores may be used for synchronization of various processes and/or control of various processes. Applications or processes in the first computer system 82 and the second computer system 86 may each read data from a semaphore stored on the third computer system 88, and/or write data to a semaphore stored on the third computer system 88. Effectively, the first computer system 82 and the second computer system 86 may communicate through a semaphore located or stored in a computer memory on the third computer system 88.

Alternatively, the first computer system 82, the second computer system 86, and the third computer system 88 may each store an application program, wherein the application programs on each computer 82, 86, and 88 may use a semaphore to communicate with each other, synchronize operations, or otherwise share data. One or more of the first computer system 82, the second computer system 86, or the third computer 88 may store the semaphore that is used by the respective application programs.

Figure 2A:
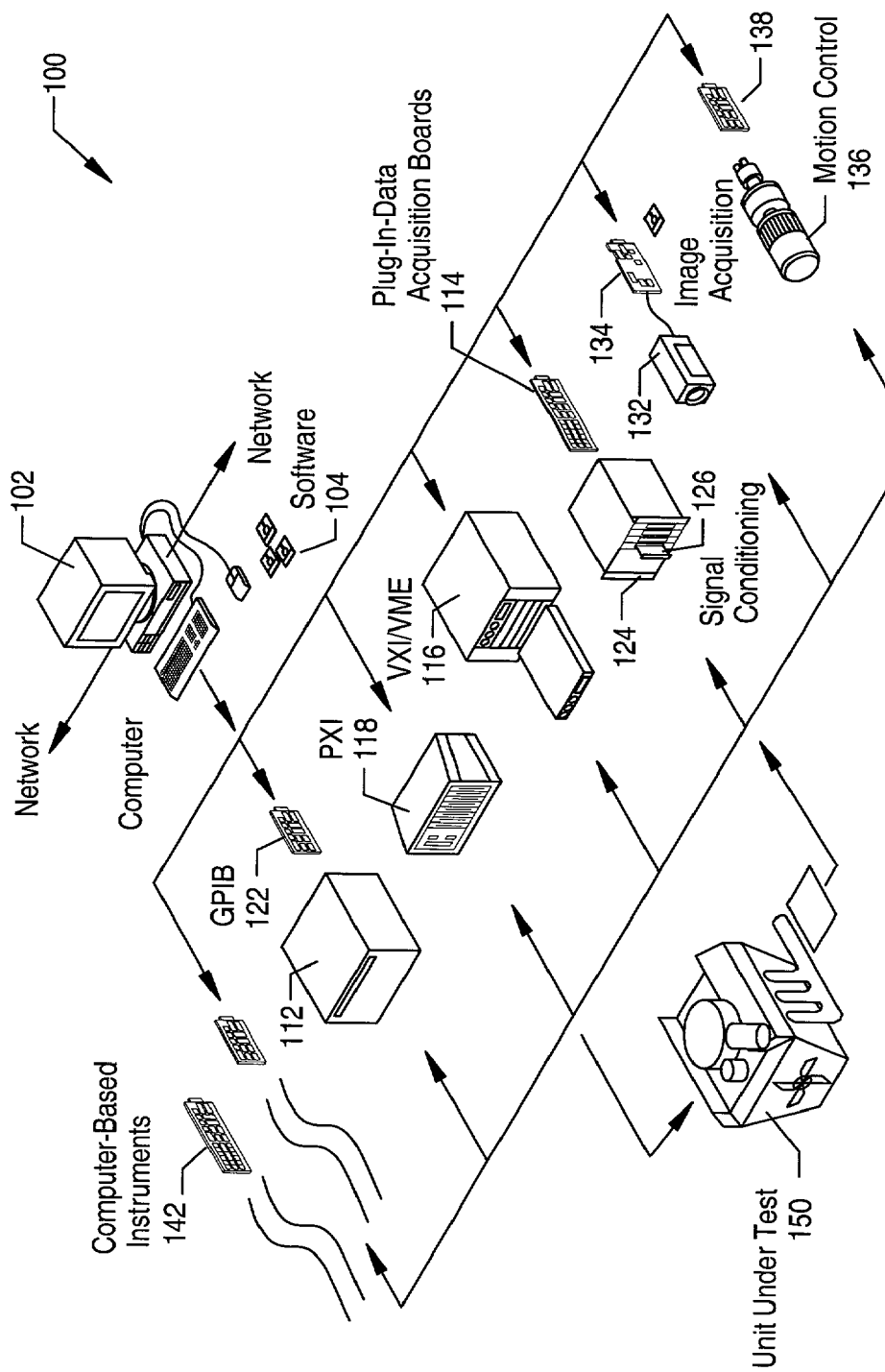
FIGS. 2A and 2B illustrate representative instrumentation and process control systems including various I/O interface options.
Figure 2B:
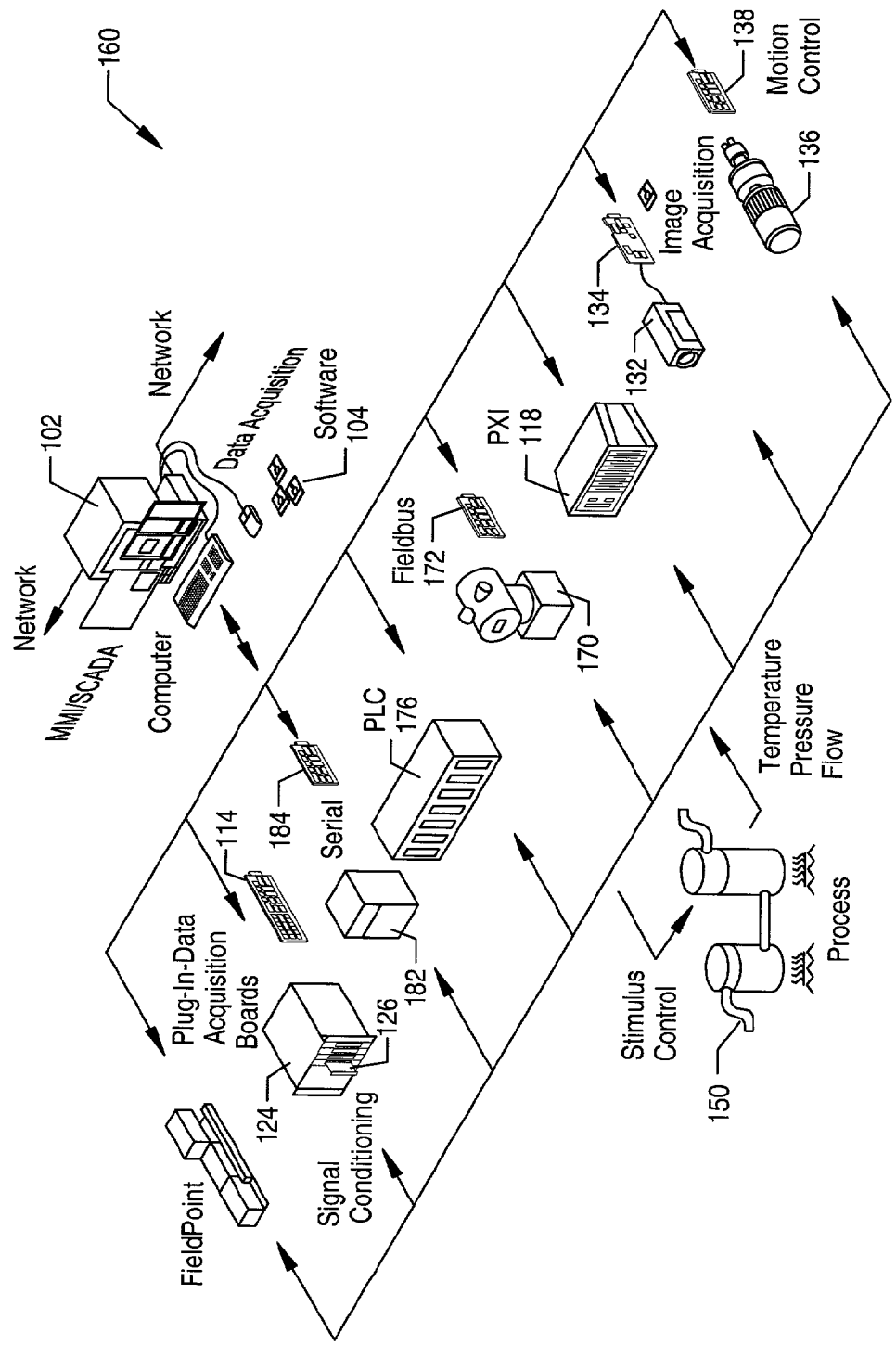

FIGS. 2A and 2B: Instrumentation and Industrial Automation Systems

FIGS. 2A and 2B illustrate an exemplary computer 102 having various types of instruments or hardware devices connected. In various embodiments, the computer 102 may be any of the computers 82, 86, or 88 discussed above. It is noted that FIGS. 2A and 2B are exemplary only, and in alternative embodiments, application programs such as described herein may execute on any of various types of systems and may be used in any of various applications.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an IO slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument of each interface type will not be present, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device of each interface type will not be present, and in fact many systems may only have one or more devices of a single interface type, such as only PLCs. The devices are coupled to the device or process 150.

Examples of Using Semaphores

The systems shown in FIGS. 2A and 2B may use semaphores in various different manners. For example, an application program may execute on the computer 102 and may use the data socket client to write data acquired from a connected hardware device to a data target, such as a semaphore. The semaphore may be stored on the memory of the local computer 102, a device connected to the computer 102, a second computer connected through a network, or a device connected to the second computer. Alternatively, one or more of an application program executing on the computer 102 and an application executing on a device (e.g., an instrument) may each use a respective data socket client to access a semaphore, wherein the semaphore may be stored in the memory of the computer 102 or on the device. Further, two difference devices may use a semaphore to communicate, synchronize operations or share data between them, wherein applications (e.g., embedded applications) executing on each device may use a data socket client for accessing the semaphore.

The systems shown in FIGS. 2A and 2B may use semaphores for various purposes. For example, two or more application programs, two or more devices, or a combination of one or more application programs and one or more devices may use a semaphore to 1) synchronize measurements of the devices, e.g., the semaphore may be used as a trigger for triggering data acquisition or measurements (e.g., to control triggering between an image acquisition board and a motion control board); 2) synchronize operation of two or more applications and/or devices in a control system, such as a process control or manufacturing control system; 3) allow two or more applications and/or devices in a measurement system or control system to share status information, such as status information of the system being controlled; or 4) allow two or more applications and/or devices in a system to share data or information or synchronize operations to perform simulation of a system or process (for example, the semaphore may be used to store a "real time" or "standard time" for the simulation, or may be used to convey status information or other data between two simulation programs, such as in a hardware-in-the-loop simulation system).

One example of the use of a semaphore is described in U.S. Pat. No. 6,122,713 titled "Dual Port Shared Memory System Including Semaphores for High Priority and Low Priority Requestors", which is hereby incorporated by reference in its entirety as though fully and completely set forth herein.

Two or more applications and/or devices may also use the semaphore for various network management functions, as is well known in the art. Various other uses may be made of the semaphore, as is well known in the art.

One or more of the computer systems 82, 86 or 88, e.g., the computer system 102, preferably includes a memory medium on which software according to one embodiment of the present invention may be stored. For example, the memory medium may store an application program that is operable or configured to subscribe to data from a semaphore and/or publish data to a data target, as described herein. In one embodiment, the memory medium may store a software component or program, such as a data socket client, as well as other software that enables reading data from (or subscribing to data from) a semaphore, and/or publishing or writing data to a data target in response to a URL. The software component or data socket client may be useable by the application for accessing (reading or writing) the semaphore. Also, the memory medium may store an application development environment which utilizes the methods described herein to support the creation and/or execution of application programs that reference semaphores.

The term "memory medium" is intended to include an installation medium, e.g., a CD-ROM, floppy disks 104, or tape device, a computer system memory or random access memory such as DRAM, SRAM, EDO RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system, embedded computer, or other device. In general, the term "computer system" can be broadly defined to encompass any device having at least one processor which executes instructions from a memory medium.

Figure 3:
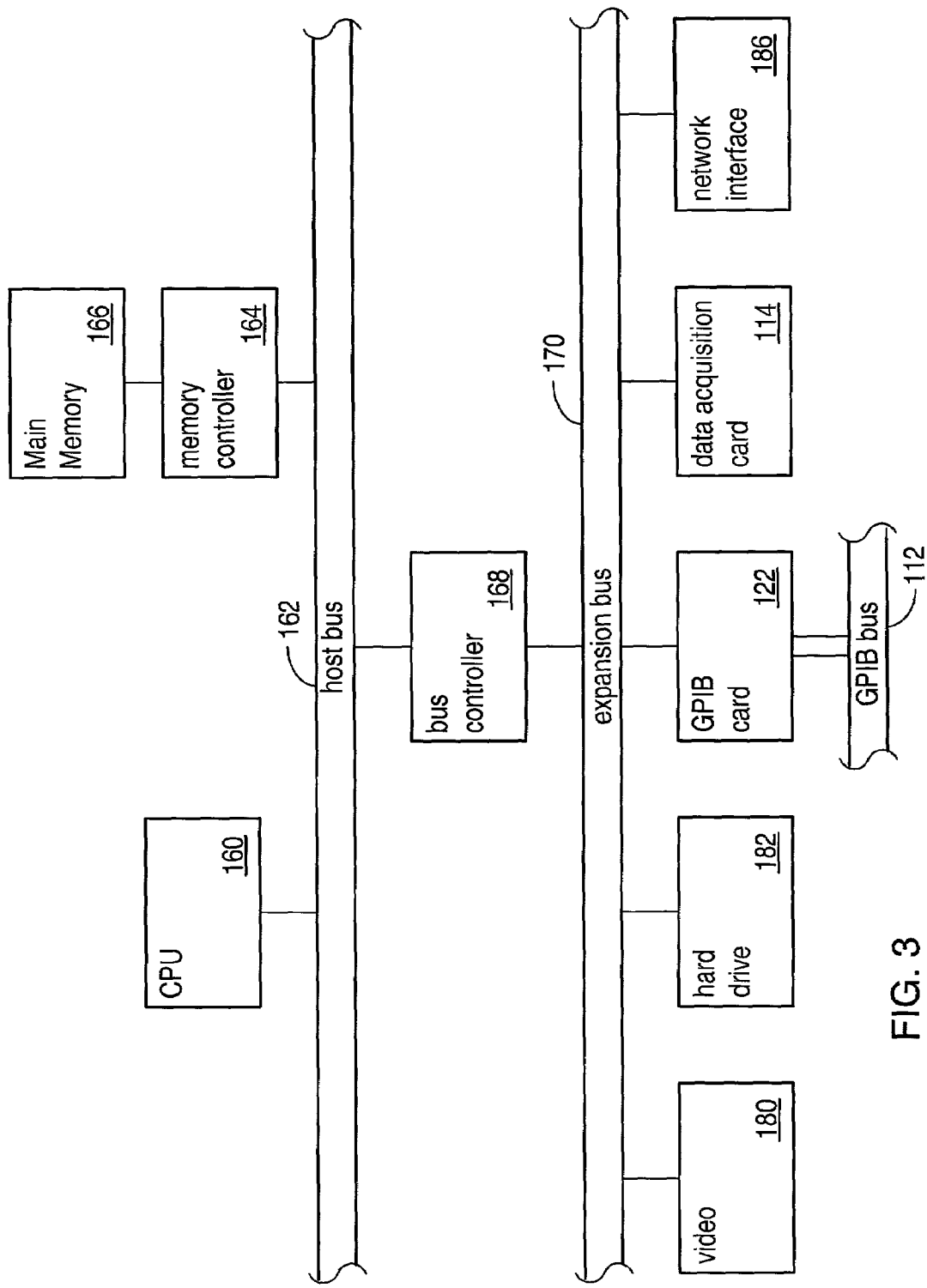
FIG. 3 is a block diagram of the computer systems of FIGS. 1A, 1B, 2A and 2B.

FIG. 3: Computer System Block Diagram

Referring now to FIG. 3, an exemplary block diagram of the computer system illustrated in FIGS. 2A and 2B is shown. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the operation of the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores a program development system, preferably an object-based or component-based program development system. The main memory 166 also may store an application program and a data socket client according to the present invention. The main memory 166 also stores operating system software as well as the software for operation of the computer system, as well known to those skilled in the art. The main memory 166 may also store one or more semaphores for synchronization and/or control. The data socket client will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition card 114 (of FIG. 2A), a GPIB interface card 122 which provides a GPIB bus interface to the GPIB instrument 112 (of FIG. 2A), and a network interface 186. The computer 102 further comprises a video display subsystem 180 and hard drive 182 coupled to the expansion bus 170.

Figure 4:
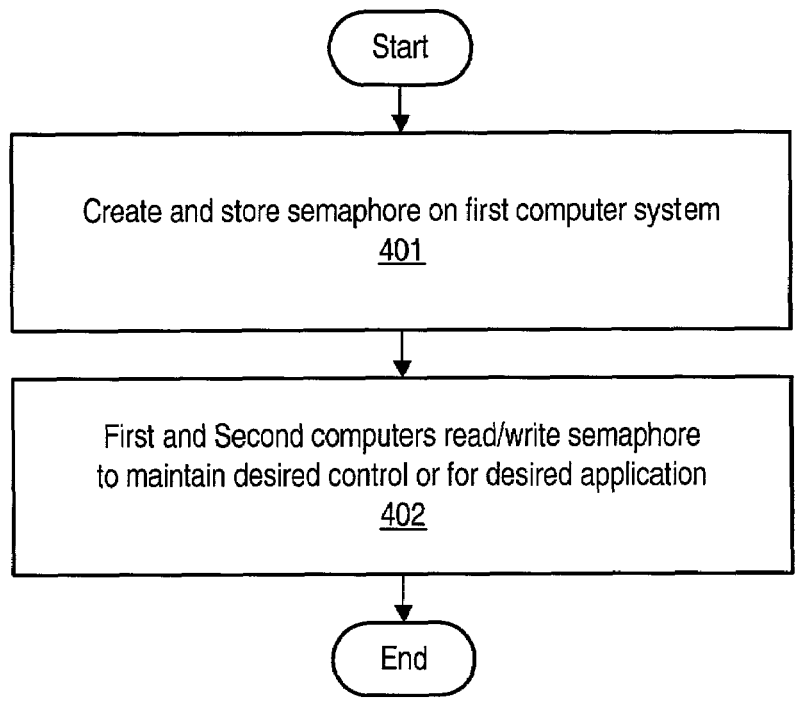
FIG. 4 is a flowchart diagram illustrating creation and use of a semaphore according to one embodiment of the present invention.

FIG. 4: Creation and Use of a Semaphore

FIG. 4 is a flowchart diagram illustrating creation and use of a semaphore according to one embodiment of the present invention. As shown, in step 401 a semaphore may be created and stored on the first computer system. This may involve allocating a known memory location for storage of relevant data. Step 401 may also include configuring application programs and/or data socket clients to access this semaphore memory location.

In step 402 the semaphore may be read from and/or written to by the first computer system and/or the second computer system (i.e., by applications executing on the first computer system and/or the second computer system) for use by a desired application, or to maintain desired communication, synchronization, or control. When a data socket client accesses (reads or writes) a semaphore, the data socket client performs various operations which greatly simplify this data access. For example, the data comprised in the semaphore may be of a first data type of a plurality of different possible data types. An application program may invoke the data socket client when the semaphore is desired to be accessed, and the data socket client may access the semaphore using location information of the semaphore (e.g., a uniform resource locator (URL) specifying a location of the semaphore). The data socket client may access the data comprised in the semaphore and may automatically convert the data into a format useable by the application program after the first software component receives the data. The application program may receive and process the data after the data is converted. Thus the application program is not required to handle any of the data access, retrieval, or data conversions involved. The accessing, conversion and processing of the data may be performed a plurality of times. Additionally, as noted above the accessing, conversion and processing of the data may be performed without any user programming required. The first software component may perform a locked read-modify-write operation on the data comprised in the semaphore, as described below. Accessing the data comprised in the semaphore may include the following steps, performed by the first software component: locking the semaphore, reading the data comprised in the semaphore, writing new data to the semaphore, and unlocking the semaphore.

Figure 5A:
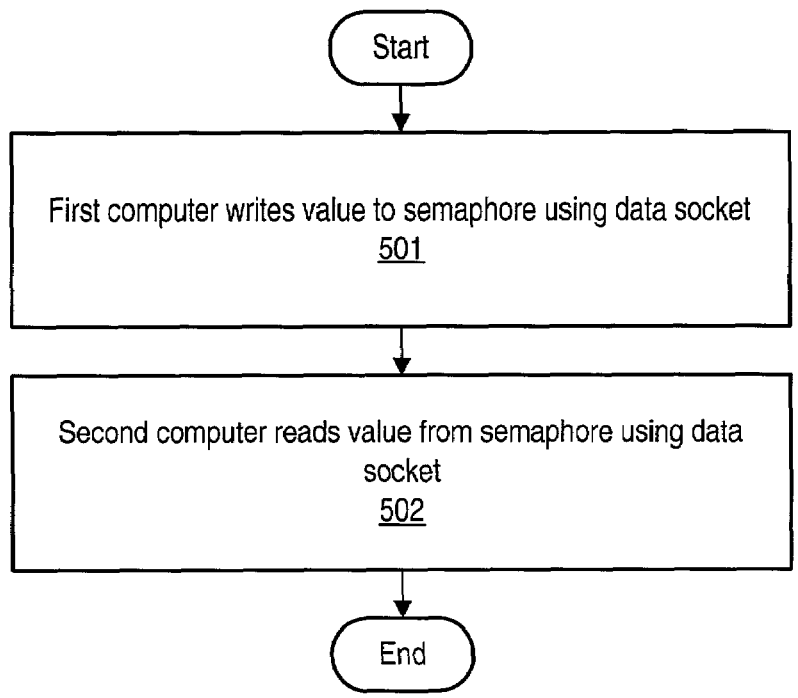
FIG. 5A is a flowchart diagram illustrating writing and reading of a semaphore using a data socket according to one embodiment of the present invention.

FIG. 5A: Writing and Reading of a Semaphore

FIG. 5A is a flowchart diagram illustrating writing and reading of a semaphore using a data socket according to one embodiment of the present invention. The steps of FIG. 5A are a detailed version of step 402 of FIG. 4. As shown in step 501, a first application program may write a value to the semaphore using the data socket. In step 502, the second application program may read a value from the semaphore using the data socket. Alternatively, the second application program may write the value and the first application program may read the value.

Each time a data socket client executes to access (read or write) a semaphore, the data socket client handles the various details of the access, including, in the case of a read: accessing the memory location of the semaphore, obtaining the data, and converting the data into a useable format for the application; and in the case of a write: receiving the write data from the application, converting the data into an appropriate format for the semaphore, accessing the memory location of the semaphore, and writing the converted data to the semaphore.

Figure 5B:
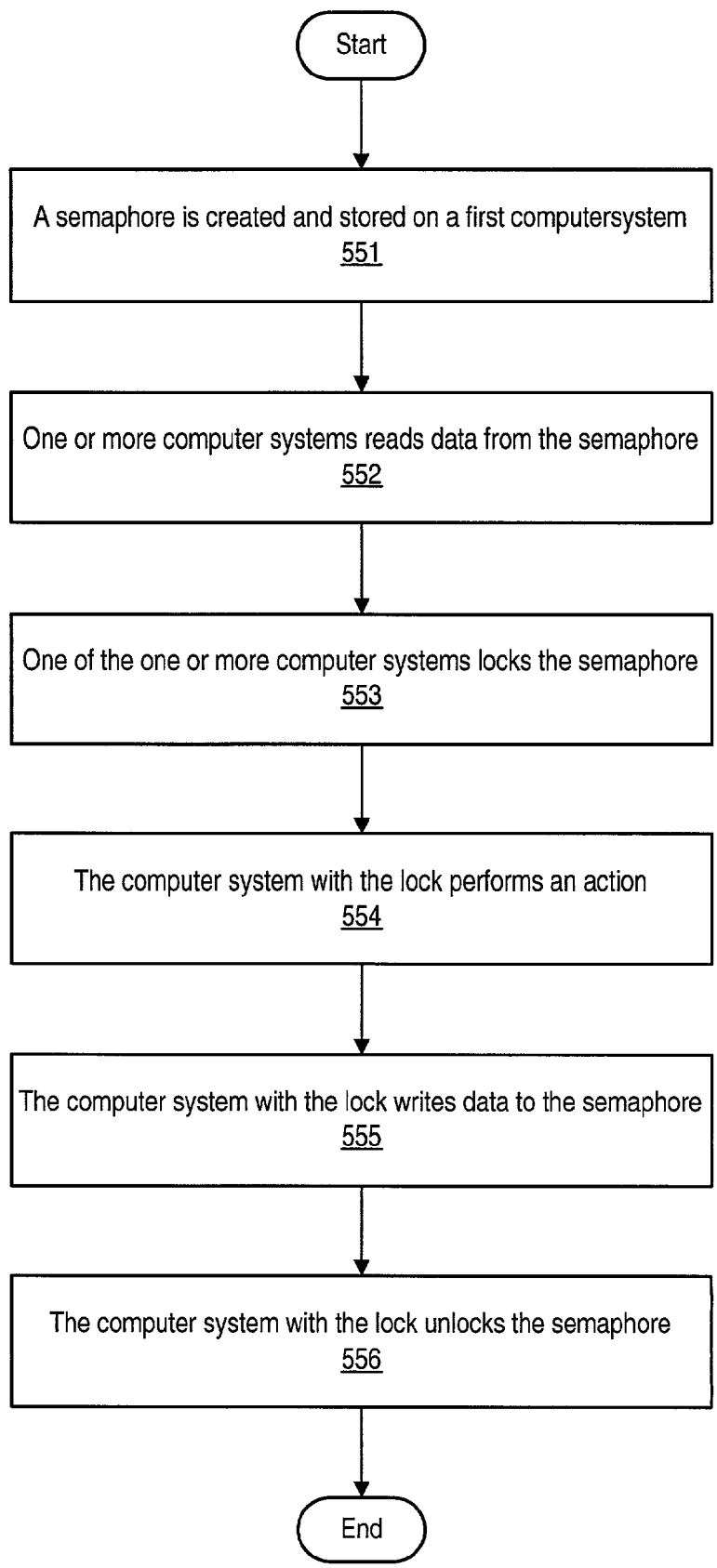
FIG. 5B is a flowchart diagram illustrating locking and unlocking of a semaphore using a data socket according to one embodiment of the present invention.

FIG. 5B: Locking and Unlocking of a Semaphore

FIG. 5B is a flowchart diagram illustrating locking and unlocking of a semaphore using a data socket according to one embodiment of the present invention.

In step 551, a semaphore is created and stored on a first computer system. The semaphore may be created as described above with respect to FIG. 4.

In step 552, one or more data socket components stored on one or more computer systems may read data from the semaphore. In step 553, one of the one or more data socket components stored on one of the computer systems may lock the semaphore such that the data socket component has exclusive rights to modify the semaphore and/or write data to the semaphore. When more than one of the one or more data socket components that are reading data from the semaphore submits a request to lock the semaphore, a queue may be created, such that each of the data socket components requesting the lock may obtain the lock, in turn.

In step 554, the computer system with the lock on the semaphore may perform an action. Typically, the type of action performed while a lock on a semaphore is held is an action that may best be performed sequentially (i.e., one at a time) rather than multiple actions performed in parallel by multiple computer systems. In step 555, the computer system with the lock on the semaphore writes data to the semaphore. The data written to the semaphore may indicate that an action was taken (e.g., incrementing a counter). In step 556, the computer system with the lock on the semaphore unlocks the semaphore. At that time, if there are other lock requests pending from other data socket components that are reading data from the semaphore, processing may loop back to step 553.

Data Socket Client and FlexData-Sharing Information Across Systems and Applications Data Socket Overview The data socket client, also referred to as "data socket", comprises a set of software components, programs and/or tools which simplify the exchange of data and information between an application and a number of different data sources and targets. These sources and targets are other entities in the system that data is written to or that data is read from and include other applications, files, HTTP servers, OLE/ActiveX automation servers, semaphores and more. In many cases these sources and targets may be located on a different machine from the one performing the read and write operations. The term "data socket" is an umbrella name for tools in different formats, such as ActiveX controls, java applets, LabVIEW Virtual Instruments (VIs), and CVI instrument drivers, using a common technology for data exchange.

The data format used by data socket tools, called Flex Data or FlexData, is enhanced for instrumentation style data and may include attributes in addition to the actual data. Data attributes may include information such as an acquisition rate, test operator name, time stamp, quality of data, etc. The Flex Data data format may be readily adapted for other applications and may include other application-specific attributes, as desired.

Data socket tools allow users to easily transfer instrumentation style data between different applications, applications and files, as well as different machines. Currently these types of transfer are done using less specialized tools such as general-purpose file I/O functions, TCP/IP functions, HTTP/HTML transfers combined with CGI programs and more. With all of these existing technologies, the user is required to perform a significant amount of programming to accomplish his/her tasks. The data socket client and tools of the present invention provide improved functionality and reduce development effort and time.

Data socket source and targets are addressed using URLs (universal resource locator) that follow the standard URL model. Data socket supports standard transfer formats including http:, ftp:, and file:, additional transfer formats may also be defined. Data socket also includes an extension mechanism that allows users to add support for future formats without modifying existing programs that use the data socket Underlying Technologies OLE/ActiveX ActiveX and COM (component object model) are preferably used in much of the underlying architecture of the data socket tools including the data socket server (DataServer) and data object (CWData ActiveX object).

TCP/IP

TCP/IP (transfer control protocol/Internet protocol) is used to transfer data between the DataServer and different data socket clients.

HTTP

HTTP (hyper text transfer protocol) is used to make requests from data socket clients to web servers and return the information.

FTP

FTP (file transfer protocol) is used to make requests from data socket clients to FTP servers and return information stored in a file.

URL

URLs (universal resource locator) are used to address or identify a data socket client's source or target. A URL string starts with its access method, such as http:, which the client uses to determine how to connect to the source or target.

Components

Data Socket Client

The data socket client, also referred to as the data socket control, is the name used to refer to the component that an application uses to connect to a data socket source or target. data socket clients have different formats for different development environments (e.g., ActiveX control, LabVIEW Virtual Instrument (VI), CVI instrument driver/DLL, etc.).

Flex Data

Flex Data, also referred to as FlexData, is the format of the underlying data packet that data socket tools use to send and store information. These packets are system independent and can be transferred over existing communication technologies such as ActiveX, Automation/COM or TCP/IP. The Flex Data data packet has provisions for adding standard and user defined named attributes that are used to further describe the information contained in the packet. For instrumentation-specific functions, information such as a time stamp, test operator name, Unit-Under-Test (UUT) identifier, and more can be added to the data being transferred. Data socket clients convert data native to an environment and its attributes into Flex Data format or convert Flex Data formatted data back into its native data form. The Flex Data packet is self-describing so no additional information need be exchanged between a client and its source or target.

Data Object

The data socket data object (e.g., CWData ActiveX object) is used in conjunction with the data socket ActiveX control to store data along with all additional attributes.

Data Socket Server

The data socket server is a stand-alone process running on a system to facilitate transfer of data between different processes when no other servers are in place. In many cases, data socket clients exchange information with some other type of server such as a web server, automation server or file server. In cases where a customer desires to directly transfer information between data socket clients, the data socket server preferably acts as the intermediate data repository. The data socket server is dynamically configurable such that any data socket can create tags (i.e., storage locations) in the data socket server. Any data socket client may then retrieve the stored information based on the name of the tag.

Implementations

ActiveX Control

The data socket client functionality is preferably implemented with an ActiveX control and underlying objects. The ActiveX control is preferably optimized for Microsoft Visual Basic/VBA (Visual Basic for Applications)/VB Script but is also compatible with other ActiveX control containers including Microsoft Visual C/C++, Borland Delphi, Borland C++ Builder, and National Instruments HiQ 4.0. The data socket ActiveX control is part of the ComponentWorks tools suite available from National Instruments Corporation and is called CWdata socket. One other significant ActiveX component is the CWData object which stores data transferred by the CWdata socket control.

LabVIEW VIs

LabVIEW/BridgeVIEW Virtual Instruments (VIs) implement the same data socket client functionality as the ActiveX control in a form native to the G programming syntax.

Instrument Driver

An instrument driver developed in LabWindows/CVI implements the same basic data socket client functionality as the ActiveX control. The instrument driver includes function panels for use in the LabWindows/CVI environment and allows creation of a DLL containing a type library. Natively in CVI the instrument driver should also support CVI callback functions to implement data socket client events.

Java Bean

One embodiment of the invention comprises a Java bean developed in Java that implements the same basic data socket client functionality as the ActiveX control. The bean is written in "Pure Java" and can be run on several different computer platforms.

Additional Components

URL AccessMethod Extensions

The data socket client includes built-in support for standard sources such as files, ftp and http. Other built-in support includes exchange with a data socket DataServer using TCP/IP, referred to as dstp. Developers are also able to define their own extensions or plug-ins that allow the data socket to connect to their own data sources (e.g., semaphores). Extensions are identified by the URL access method. The URL Access is the part of the URL string that precedes the first colon ":". A data socket extension is preferably implemented using an automation server written to a common specification. The automation server and unique extension name are registered with the operating system. The data socket client uses the automation server when it detects the corresponding access method, which is not supported natively but is registered with the OS. Applications of data socket extensions include direct links to OPC servers, external instruments, Data Acquisition (DAQ) devices, databases, multimedia devices, and others.

File Adapter Extensions

The data socket clients support certain common file formats such as tab delimited text when performing file I/O operations. As noted above, the user can also create their own file adapters that the data socket client will use to read or write files using custom-defined formats. The file name extension or other explicitly stated identifier determines the file format used for a particular operation. File adapters preferably comprise automation servers that are written to a common specification and registered with the operating system.

User Control

Data socket provides user level tools and utilities to interact and work more easily with data socket. A data socket user control provides a simple pre-defined user interface for entering a URL, connecting to the source or target, and monitoring the connection status.

Data Browser

Data Browser is a simple utility application that uses a data socket client to connect to arbitrary sources and display their data in a suitable form (graphically or text) along with any attributes stored with the data.

Applications

Interactive Web Pages

One primary use of the data socket is the ability to develop interactive web or remote interfaces for applications running on a particular machine. Currently there are tools available, including the LabVIEW and CVI Internet Toolkits, to provide some amount of interaction between a web browser and an application running on a server. However this interaction is very limited in most cases or requires significant amounts of programming using CGI and HTML image maps. The data socket tools of the present invention enable a user to very simply build a remote application that can interact with the main application to send updated information or commands back and forth. The data socket client, e.g., a data socket ActiveX control, also enables a user to simply build such a remote application in a web page and provide a web browser-based interactive interface to a server application. Applications such as running remote experiments or providing web based supervisory control to an automation process become feasible and relatively simple to implement.

Universal Input API for Programming.

The data socket may thus be used as the primary means to retrieve data into a user's application, thus greatly simplifying the task compared with using traditional I/O mechanisms like file IO. For example, by using the data socket to read in waveforms to display in a graph, the user's application is relieved from all tasks related to parsing raw data since the data socket returns the Waveform as an easy to use array of numbers. Thus an application can read data from files of many different formats, or from many different sources, such as ftp, http(web), or file servers. An end user can even allow the application to read waveforms from new file formats or new hardware devices by creating a new data socket extension.

Broadcast Distribution of Live Data

A data acquisition application can use a data socket client or control to write live data to a data socket Server that in turns distributes data to other DataSockets that have connected to the server to read data from the server. This method is advantageous over typical current scenarios since the data passed can include attributes that do not interfere with the primary value being sent. This allows the source data socket to add new attributes without breaking the data socket clients that are reading the Data.

The data socket can also be used in multimedia applications for live or distributed video, including streaming video applications and multicast video. In this application, the multimedia or video application uses a data socket client or control to write live data to a data socket Server that in turns distributes data to other data sockets that have connected to the server.

Figure 6A:
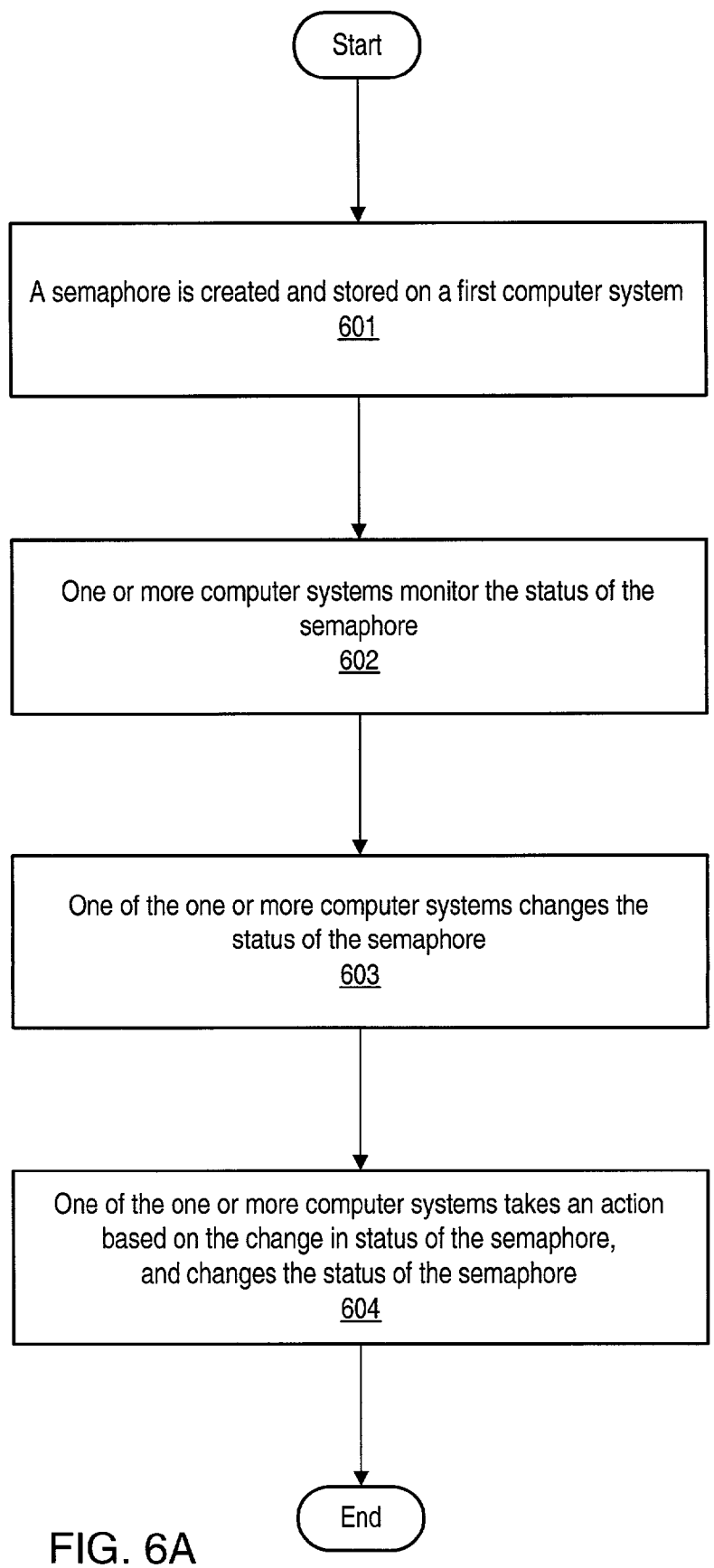
FIGS. 6A and 6B are illustrations of using a semaphore according to one embodiment of the present invention.
Figure 6B:
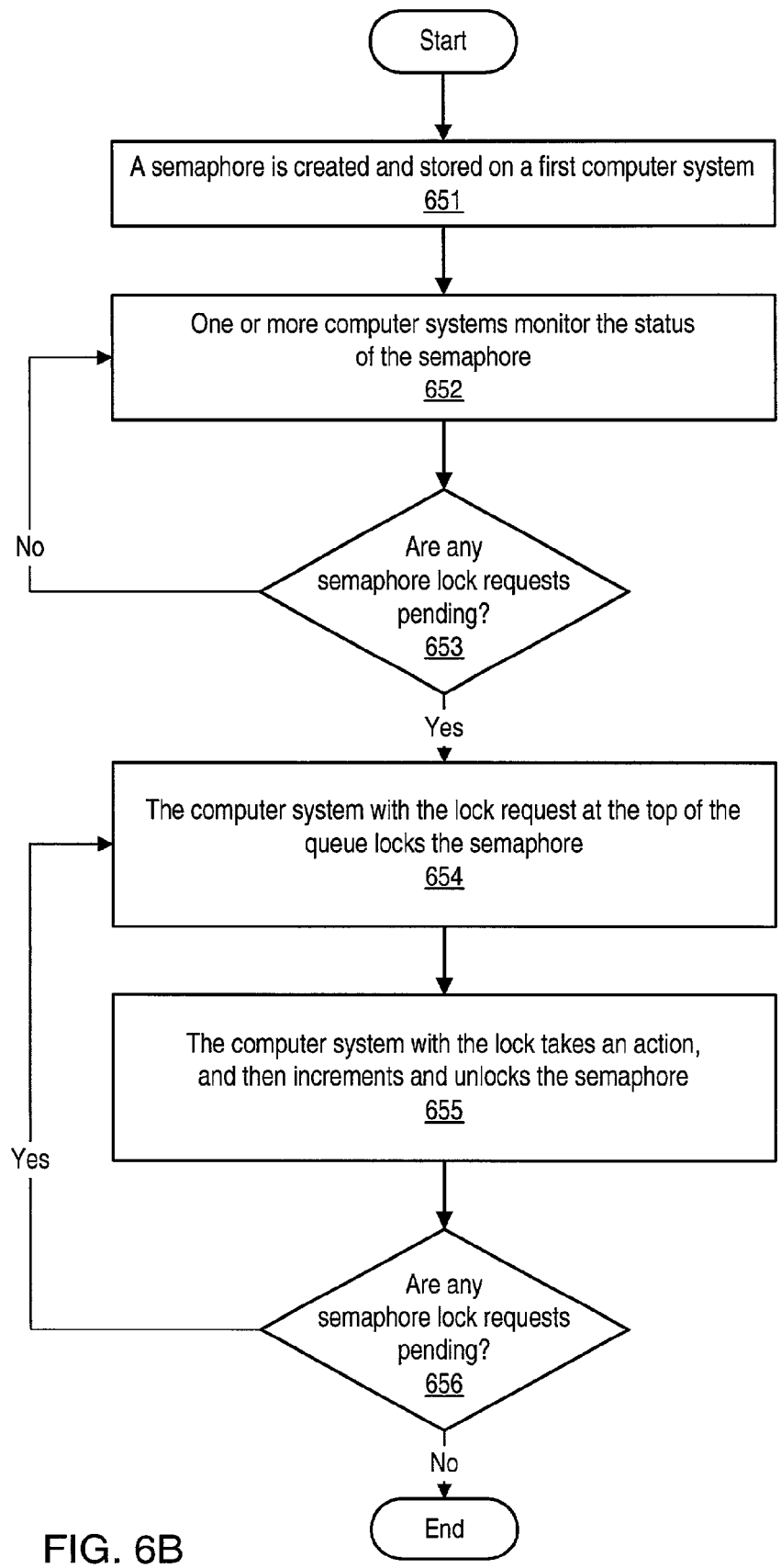

FIGS. 6A and 6B: Examples of Using a Semaphore

FIGS. 6A and 6B illustrate examples of using a semaphore, according to one embodiment of the invention. It is noted that various steps in FIGS. 6A and 6B may occur concurrently and/or in different orders. It is noted that the system and method of the present invention may be implemented in various ways, other than that shown in FIGS. 6A and 6B, as desired.

A first example of using a semaphore is shown in FIG. 6A. In step 601, a semaphore is created and stored on a first computer system. In step 602, one or more computer systems monitor the status of the semaphore. Monitoring may also be described as "read" mode. In step 603, one of the one or more monitoring computer systems may switch from "read" mode to "write" mode, and thus be able to change the status or value of the semaphore. After changing the status or value of the semaphore, the computer system would release the "write" mode permission, and revert back to a monitoring state (i.e., "read" mode). Based on the change in the status or value of the semaphore, in step 604, one of the one or more monitoring computer systems may take an action (e.g., execute a command). Upon completion of the action, the computer system may switch from "read" mode to "write" mode, and thus be able to change the status or value of the semaphore (e.g., to indicate that the command has completed successfully). As described above, after changing the status or value of the semaphore, the computer system would release the "write" mode permission, and revert back to a monitoring state (i.e., "read" mode).

A second example of using a semaphore is shown in FIG. 6B. In step 651, a semaphore is created and stored on a first computer system. In step 652, one or more computer systems monitor the status of the semaphore. In step 653, it is determined if any of the one or more monitoring computer systems has submitted a semaphore lock request (e.g., a request to obtain "write" mode). If not, the monitoring continues, as shown in step 652. However, if at least one of the one or more monitoring computer systems has submitted a semaphore lock request, then step 654 is processed. It is noted that if more than one of the one or more monitoring computer systems has submitted a semaphore lock request, then a queue is created, such that each of the computer systems submitting a semaphore lock request may be processed (i.e., each computer system may obtain "write" mode for the semaphore, in turn), one at a time. In step 654, the computer system submitting a semaphore lock request that is at the top of the queue may obtain the lock on the semaphore (i.e., obtain "write" mode). In step 655, the computer system that has the lock may then take an action, increment the semaphore, and unlock the semaphore (i.e., release the "write" mode permission). At this point, processing may continue with step 656. In step 656, it is determined if any semaphore lock requests remain in the queue. If not, the process is completed. However, if there are remaining semaphore lock requests in the queue, processing may loop back to step 654.

Figure 7:
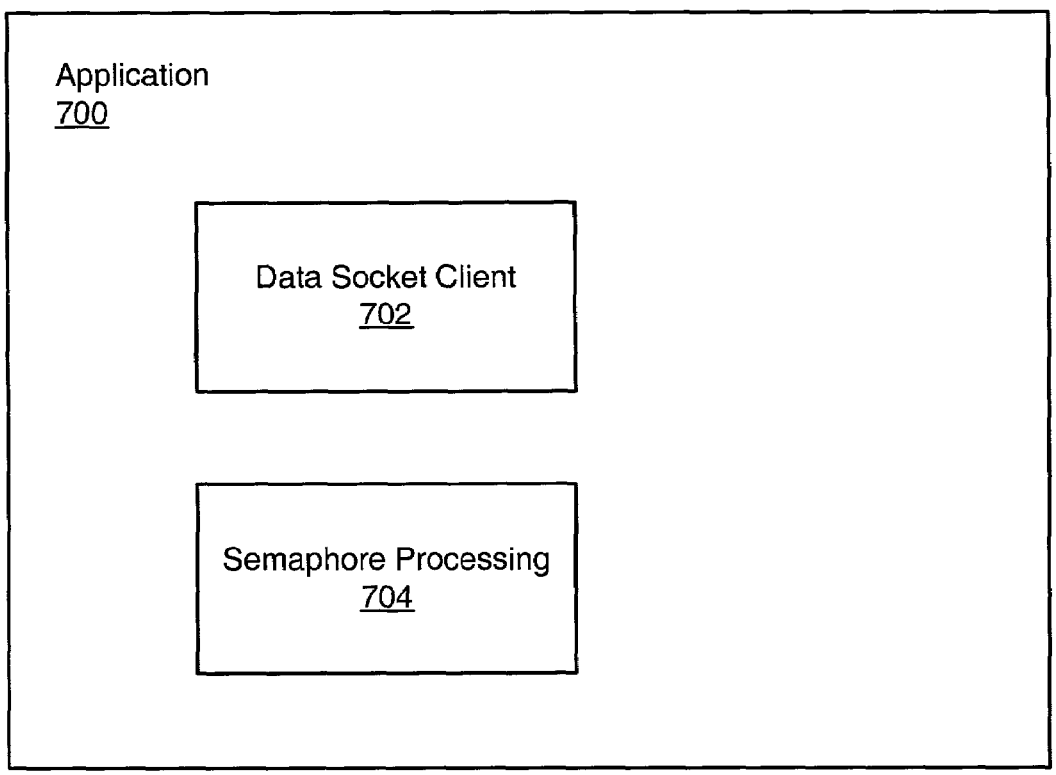
FIG. 7 illustrates an application containing a data socket client and a semaphore according to one embodiment of the present invention.

FIG. 7: An Application Containing a Data Socket Client and a Semaphore

FIG. 7 is an illustration of an application 700 including two components. The application 700 may include a data socket client 702 and semaphore processing 704.

Figure 8:
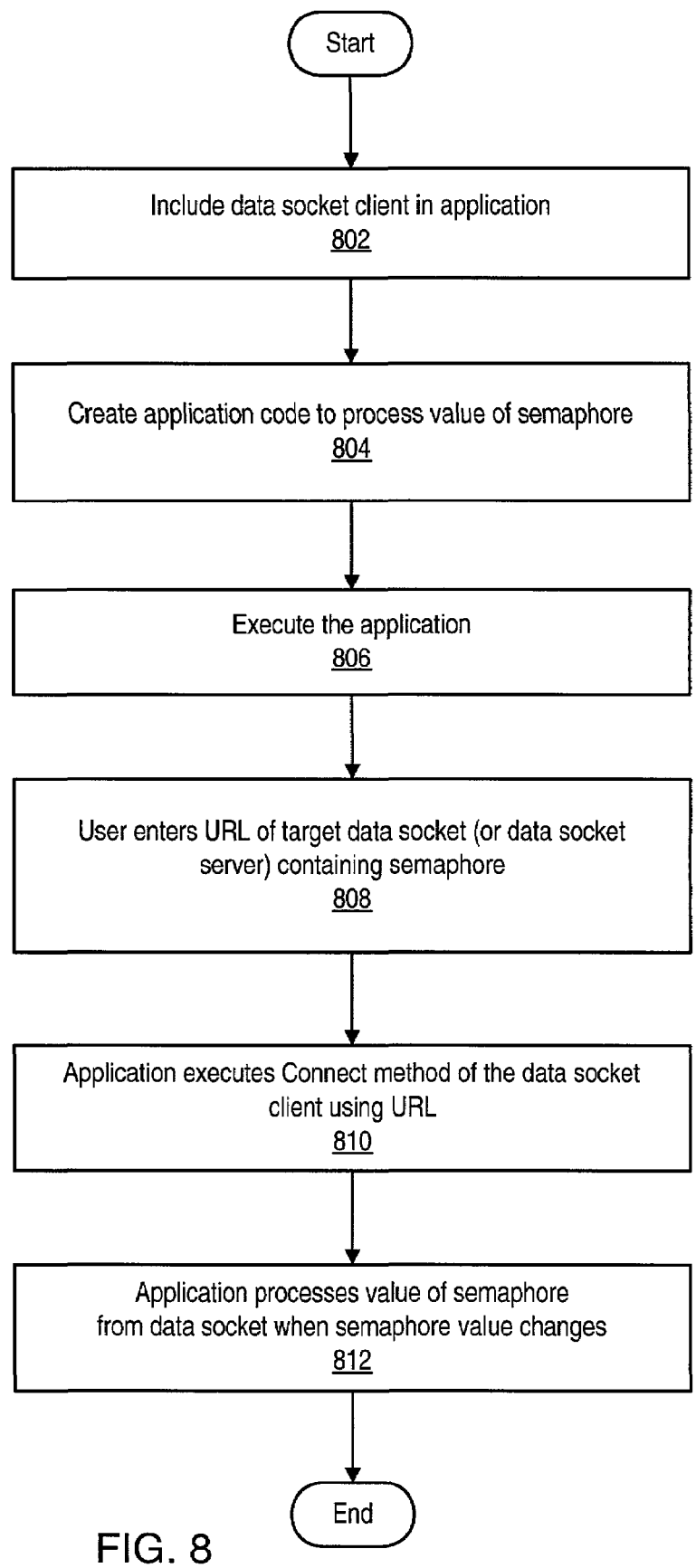
FIG. 8 is a flowchart diagram illustrating use of the data socket client of the present invention.

FIG. 8: Use of the Data Socket Client

FIG. 8 comprises a flowchart diagram illustrating use of the data socket client according to an embodiment of the present invention. It is noted that various steps in FIG. 8 may occur concurrently and/or in different orders.

As shown, in step 802 the user may include or incorporate the data socket client into an application. The data socket client may have a URL (Uniform Resource Locator) associated with it.

Where the data socket client is a control, the user may drop the data socket control, which is preferably a standard interface compliant control, onto a window of a container in step 802. An example of the window is a Visual Basic form. The standard control interface is preferably the interface defined by the Microsoft ActiveX Control Specification. Controls which conform to the ActiveX OLE Control Specification are referred to as ActiveX controls. The control dropped in step 802 is preferably embodied within the National Instruments" "ComponentWorks" product, which comprises ActiveX controls. The ComponentWorks controls are described herein as being used by the Microsoft Visual Basic development environment container. However, the ComponentWorks controls described may be employed in, but not limited to, the following list of containers: Microsoft Visual FoxPro, Microsoft Access, Borland Delphi, Microsoft Visual C++, Borland C++, Microsoft Internet Explorer, Netscape Navigator, Microsoft Internet Developer Studio, National Instruments HiQ, and any other container which supports the ActiveX control specification.

The data socket client may also take other forms for different development environments, such as a LabVIEW Virtual Instrument (VI), a DLL (dynamic linked library), or an instrument driver/DLL, among others. In these environments, the data socket client may be included in an application in a similar manner to other re-useable software components.

In step 804 the user may create application code in the application to process the value of a semaphore. Thus, when a semaphore value changes, this application code may execute to process the new value according to the desired application being performed. In step 806 the user may execute the application.

In step 808 the user may enter the URL of the target data socket or the data socket server. It is noted that the URL may also be entered or configured during creation of the application, i.e., prior to execution of the application in step 806.

In step 810 the application may execute a Connect method of the data socket client using the URL. As noted above, the URL may be received in step 808 or may be entered or configured prior to execution of the application. The Connect method may operate to access the data socket specified by the URL and to retrieve the semaphore value for the application. This may also involve converting the data to a different format, such as the Flex Data format described herein. A more detailed discussion of execution of the Connect method of the data socket client is discussed with reference to the flowchart of FIGS. 9A and 9B.

When the data socket client generates an event signifying a change in the value of the semaphore, then in step 812 the application may process the new semaphore value from the data socket.

It is noted that steps 808–812 may be performed one or more times during the execution of the application, as desired. It is also noted that other addressing schemes are contemplated for steps 808 and 810. Thus, depending on the evolution of the Internet and http, if other mechanisms are used for accessing data or web sites, these other mechanisms may be used in steps 808 and 810. In addition, if the present invention is used with other or later developed broadband networks, other types of accessing information may be used. Thus the term "URL" is intended to include similar methodologies for accessing data, web sites, etc.

Figure 9A:
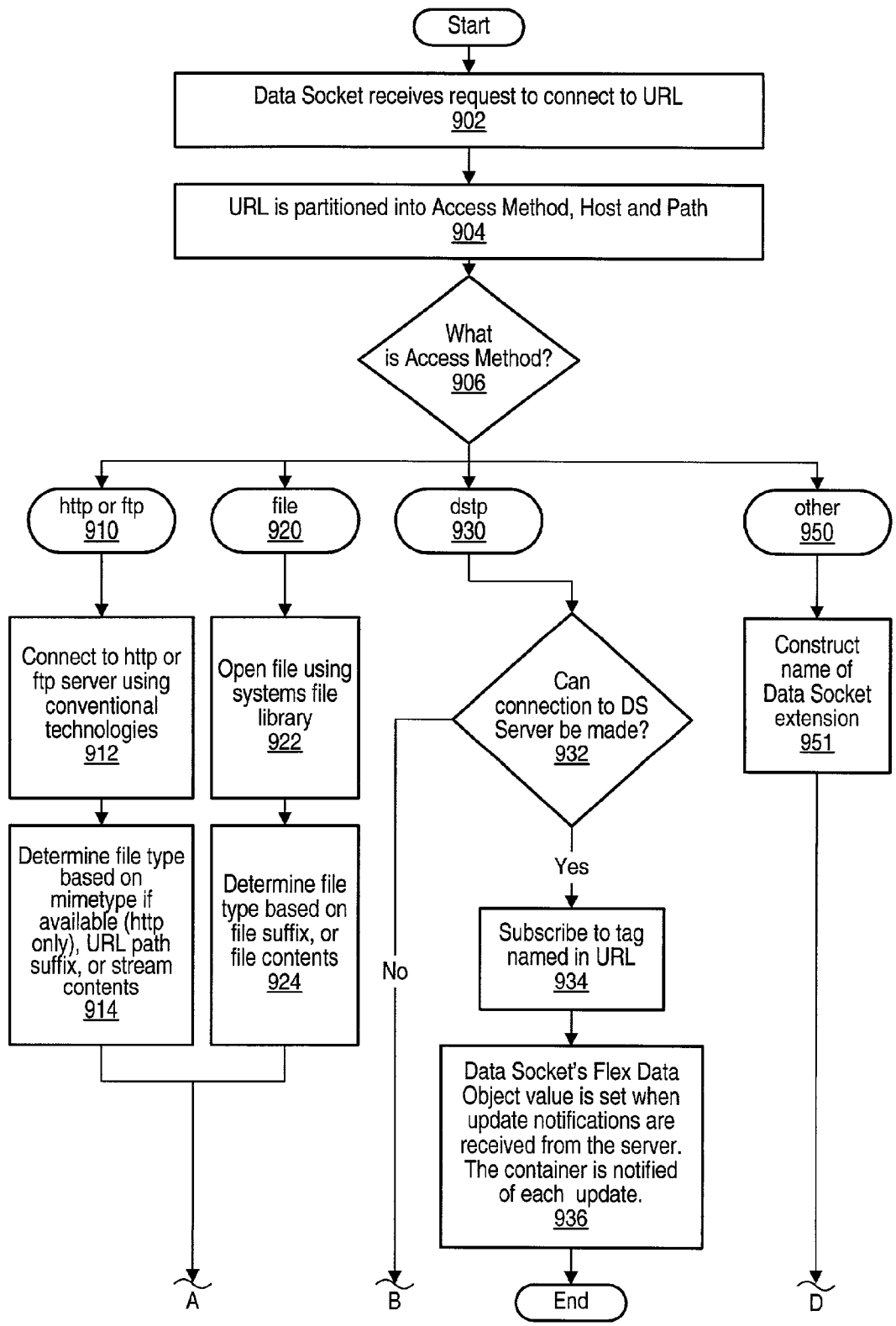
FIGS. 9A and 9B are a flowchart diagram illustrating execution of the data socket client of the present invention.
Figure 9B:
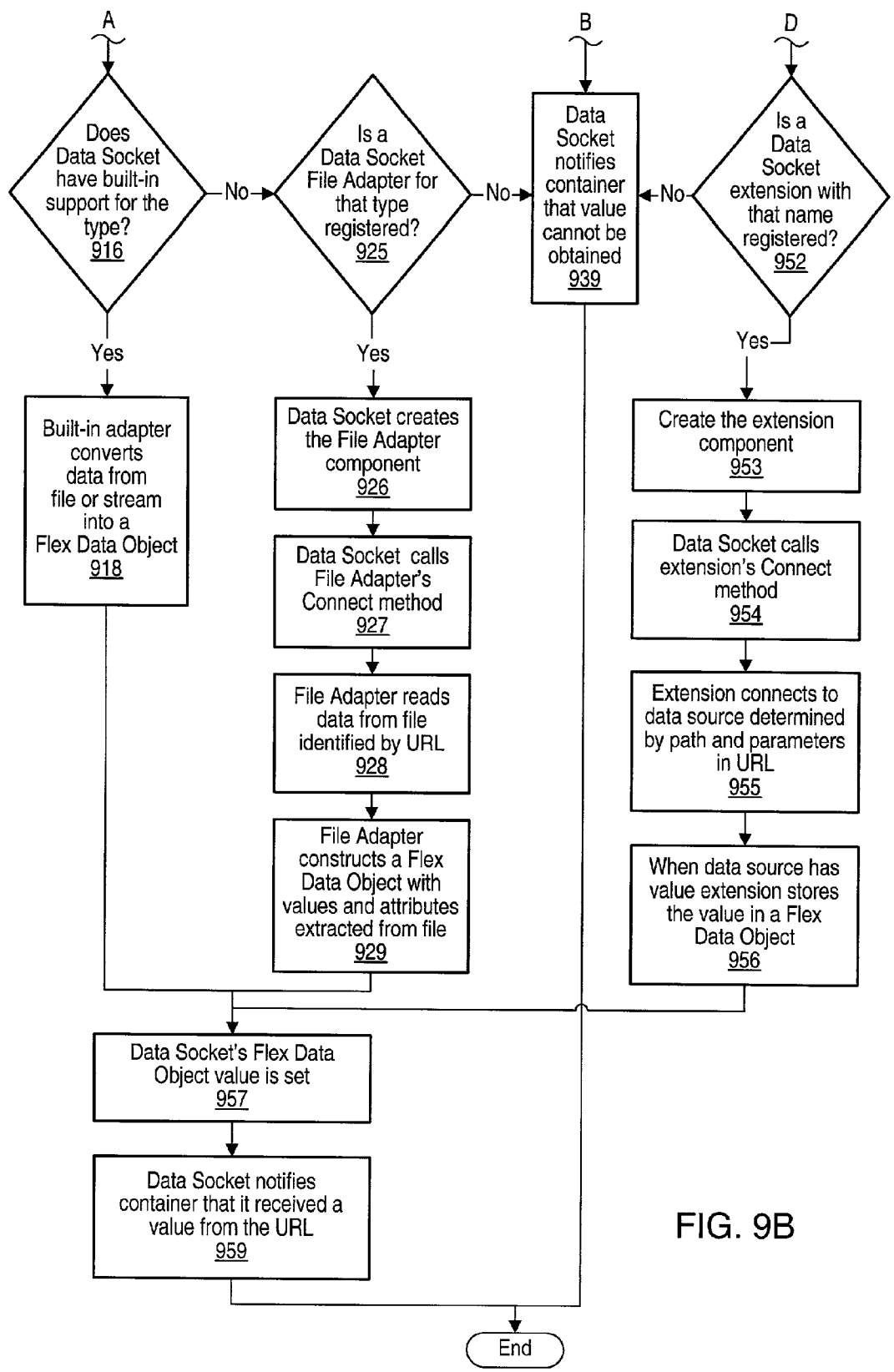

FIGS. 9A and 9B: Connect Method Flowchart Diagram

FIGS. 9A and 9B comprise a flowchart diagram illustrating the Connect method in the data socket client according to one embodiment of the invention. It is noted that various steps in FIGS. 9A and 9B may occur concurrently and/or in different orders. It is noted that the system and method of the present invention may be implemented in various ways, other than that shown in FIGS. 9A and 9B, as desired.

As shown, in step 902 the data socket client receives the request to connect to the specified URL. In other words, the user has entered the URL of the target data socket in step 808 of FIG. 8, and in step 902 the data socket client receives this user input.

In step 904 the data socket client partitions the URL into an AccessMethod, Host and Path. The AccessMethod of the URL preferably comprises the first entry in the URL, e.g., either http, ftp, file or dstp. Other AccessMethods are also contemplated. The "Host" portion specifies the host computer where the data is located, and the "Path" specifies the path where the data is located on the host computer.

In step 906 a determination of the AccessMethod occurs. If the AccessMethod is either http or ftp as determined in step 910, then in step 912 the data socket client connects to the http or ftp server using conventional technology, e.g., using conventional Internet technology.

After step 912, in step 914 the data socket client determines the file type. The data socket client determines the file type for http based on the mime type. The data socket client may also determine the file type based on the URL path suffix and/or the stream contents. After step 914, operation proceeds to step 916.

If the access method is "file" as determined in step 920, then in step 922 the data socket client opens the file using the system's file library. In step 924 the data socket client determines the file type based on the file suffix or the file contents. After step 924, operation advances to step 916.

After the data socket client has determined the file type in either of steps 914 or 924, in step 916 the data socket client determines if it has built-in support for the type. If the data socket client has built-in support for the file type as determined in step 916, then in step 918 the built-in adapter comprised in the data socket client converts the data from the file or stream into a Flex Data object, also referred to as a FlexDataObject.

In step 918 the data socket client converts the data into a form more usable by a typical programming language or application. Examples of data converted by the data socket include WAV files, tabbed text files, DSD files, and text. For example, if the data is retrieved from a spreadsheet, the data socket client converts the tab delimited spreadsheet data into a 2D array of numbers, without any tabs or ASCII strings. This 2D array of numbers is not required to be parsed by the containing application. Also, in general, a number of engineering formats exist for storing vectors or arrays. The data socket client preferably operates to convert data of these various formats into arrays of data or numbers for direct use by the application. After step 918, operation proceeds to step 957.

In step 957 the Flex Data object value in the data socket client is set. This means that the data which was converted into the more usable form in step 918, such as a 2D array, is now stored in memory managed by an object that is accessible by the client program. In the current embodiment the client application can get a copy of the value from the Flex Data object by calling a method on the Flex Data object named "GetValue". This method preferably returns a copy of the value stored in a VARIANT, a structure defined by Microsoft as part of its ActiveX standard for component software. The value of attributes can be obtained by calling a method named GetAttribute, or set by calling a method named SetAttribute. A VARIANT structure is used for attributes as well. The VARIANT structure can hold simple data types like numbers or Boolean values and data types that require additional memory for storage such as strings and arrays.

In step 959 the data socket client notifies the container or application that it has received a value from the URL, preferably through a new data event. Operation then completes.

If the data socket client does not include built-in support for the file type as determined in step 916, then in step 925 the data socket client determines if a data socket file adapter is registered for that type. A data socket file adapter is created by a user and registered with the data socket. The data socket file adapter is used to read or write files using custom-defined formats. If a data socket file adapter is not registered for that type, then in step 939 the data socket client notifies the container or application that the value cannot be retrieved, and operation completes.

If a data socket file adapter is registered for that file type as determined in step 925, then in step 926 the data socket creates the file adapter component or client. In step 927 the data socket client calls or invokes the file adapter's Connect method. In step 928 the file adapter reads data from the file identified by the URL. In step 929 the file adapter constructs a Flex Data object with values and attributes extracted from the file.

After steps 926-929 have been performed, in step 957 the Flex Data object value in the data socket client is set, and in step 959 the data socket client notifies the container or application that it has received a value from the URL, and operation completes.

If the access method is "dstp" as determined in step 930, then in step 932 the data socket client attempts to make a connection to the data socket server identified by the URL using the host name or Internet address encoded in the URL according to standard URL syntax. As described above, the access mode "dstp" directs the data socket client to connect to the data socket server identified in the URL. If the connection is established in step 932, then in step 934 the data socket client sends a command indicating a request to subscribe to a specific tag, or to write the value of a specific tag maintained by the data socket server. The data socket client preferably sends this command over TCP/IP. If the specific tag does not exist on the server, then the server may create the tag and give it an initial value, or may report back an error indicating that the requested tag does not exist. This is a configuration option on the data socket server. Reporting errors is preferably done by sending commands over the TCP/IP connection. Commands are preferably sequences of bytes sent over a TCP/IP connection.

After step 934, as updates are received in step 936, the data socket client sets the value in the data socket's Flex Data object and notifies the container. Thus, each time update notifications are received from the server, the Flex Data object is set and the container or application is notified of each update. Step 936 is continually performed as data is received until the container instructs the data socket client to disconnect from the URL to which it is connected.

If the access method is something other than previously noted (i.e., not http, not ftp, not file, and not dstp) as determined in step 950, then in step 951 the data socket client derives or constructs the name of an extension or plug-in from the access method that was specified in the URL. For example, if the access method is "opc" then the name of the extension or plug-in may be "DataSocketPlugIn_opc".

In step 952 the data socket client determines if a data socket extension or plug-in with the constructed name is registered. Thus, if the access method is not one of the predefined types, e.g., http, ftp, file, or dstp, in steps 951 and 952 the data socket client attempts to intelligently determine the proper extension or plug-in from the access method that was specified in the URL.

If no data socket plug-in is registered with the derived name, then the data socket client notifies the application or container that the value cannot be retrieved in step 939, and operation completes. Alternatively, if a data socket plug-in is registered for the determined extension name as determined in step 952, then steps 953-956 are performed.

In step 953 the data socket client creates an extension component based on the registered data socket extension. In other words, the data socket client instantiates a component from the registered data socket extension.

In step 954 the data socket client calls the extension component's Connect method. In step 955 the extension or plug-in connects to the semaphore determined by the path and parameters in the URL. In step 956, when the semaphore has a value, the extension stores the value in a Flex Data object and operation then advances to step 957. As discussed above, in steps 957 and 959 the data socket client's Flex Data object value is set and the data socket client notifies the container that it has received a value from the URL, and operation then completes.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

The invention claimed is:

1. A computer-implemented method for accessing data from a semaphore in a computer system, comprising:
including a first software component in a first application, wherein the first software component is operable to access data from the semaphore, wherein the semaphore is stored in a computer memory, wherein the semaphore is operable to store data of any of a plurality of different data types, wherein the data comprised in the semaphore has a first data type of the plurality of different data types, and wherein the plurality of different data types comprise two or more of:
WAV file;
numeric;
text;
tabbed text file;
DSD file;
formatted vector;
formatted array; or
tab delimited spreadsheet data;
executing the first application;
receiving a uniform resource locator (URL) which specifies a location of the semaphore, wherein URL is received in response to user input;
the first software component connecting to the computer memory using the location information;
the first software component accessing the data comprised in the semaphore; and
the first software component converting the data into a format useable by the first application after the first software component connects to the computer memory and receives the data.

2. The method of claim 1, wherein the first software component performs a locked read-modify-write operation on the data comprised in the semaphore.

3. The method of claim 1, wherein the first software component accessing the data comprised in the semaphore comprises:
the first software component locking the semaphore;
the first software component reading the data comprised in the semaphore;
the first software component writing new data to the semaphore; and
the first software component unlocking the semaphore after said writing new data to the semaphore.

4. The method of claim 3, further comprising:
receiving one or more requests to perform a locked read-modify-write operation on the data comprised in the semaphore from other software components;
storing said one or more requests in a queue; and
wherein said one or more requests are processed after said unlocking.

5. The method of claim 1, further comprising:
the first application receiving and processing the data after said converting;
wherein the first application uses the data comprised in the semaphore to synchronize operations with a second application executing on a second computer system.

6. The method of claim 5, further comprising:
the first software component notifying the application that the data has been obtained after the software component connecting to the semaphore and receiving the data; and
wherein the application receives and processes the data after said notifying.

7. The method of claim 5, wherein the software component connecting to the semaphore, the software component receiving the data, the software component converting the data, and the application receiving and processing the data are performed a plurality of times.

8. The method of claim 1, wherein the software component connecting to the semaphore, the software component receiving the data, and the software component converting the data are performed without any user programming required.

9. The method of claim 1, wherein the format is a self-describing format.

10. The method of claim 1, wherein said converting comprises converting the data into a generic format.

11. The method of claim 1, wherein said converting comprises:
converting the data into a first format, wherein the first format includes the data and one or more attributes of the data.

12. The method of claim 1, wherein the first software component is comprised in a first computer system,
the method further comprising:
including a second software component in a second application, wherein the second software component is comprised in a second computer system, wherein the second software component is operable to access the data comprised in the semaphore;
executing the second application;
the second software component receiving the URL which specifies the location of the semaphore;
the second software component connecting to the computer memory and receiving the data comprised in the semaphore using the location information; and
the second software component converting the data into a format useable by the second application after the second software component connects to the computer memory and receives the data.

13. The method of claim 12, wherein the first and second applications use the semaphore to synchronize operation of the first and second applications.

14. The method of claim 12, wherein the first computer system, the second computer system, and the computer memory are connected through a network.

15. The method of claim 12, wherein the computer memory storing the semaphore is comprised in the first computer system or the second computer system.

16. The method of claim 1, wherein accessing data from a semaphore in a computer system comprises publishing or writing data to the semaphore.

17. A system which enables a plurality of computer systems to share a semaphore in a computer memory, the system comprising:
 a computer memory which stores the semaphore, wherein the semaphore is operable to store data corresponding to any of a plurality of different data types;
 wherein the plurality of different data types comprise two or more of:
  WAV file;
  numeric;
  text;
  tabbed text file;
  DSD file;
  formatted vector;
  formatted array; or
  tab delimited spreadsheet data;
 wherein each computer system of the plurality of computer systems stores a corresponding software component in a corresponding application, wherein the corresponding software component is operable to access the semaphore, wherein the semaphore data comprises a first data type of the plurality of different data types;
 wherein each software component is operable to receive a uniform resource locator (URL) which specifies a location of the semaphore, wherein the URL is received in response to user input;
 wherein each software component is operable to access the semaphore and the data comprised in the semaphore using the URL; and
 wherein each software component is operable to convert the data into a format useable by its corresponding application after each software component connects to the semaphore and receives the data.

18. The system of claim 17, wherein one or more of the corresponding software components perform a locked read-modify-write operation on the data comprised in the semaphore.

19. The system of claim 17, further comprising:
 each corresponding application receiving and processing the data after said converting.

20. The system of claim 17, wherein each software component connecting to the semaphore, each software component receiving the data, and each software component converting the data are performed without any user programming required.

21. The system of claim 17, wherein said converting comprises:
 converting the data into a first format, wherein the first format includes the data and one or more attributes of the data.

22. A system for accessing a semaphore, the system comprising:
 a first computer system, wherein the first computer system comprises a first processor and a first memory medium, wherein the first processor is coupled to the first memory medium; and
 a computer memory, wherein the computer memory comprises the semaphore, wherein the semaphore is operable to store data of any of a plurality of different data types, wherein the semaphore comprises data of a first data type of the plurality of different data types, wherein the computer memory is coupled to the first computer system;
 wherein the plurality of different data types comprise two or more of:
  WAV file;
  numeric;
  text;
  tabbed text file;
  DSD file;
  formatted vector;
  formatted array; or
  tab delimited spreadsheet data;
 wherein the first memory medium comprises a first application that includes a first software component, wherein the first software component is executable by the first processor to:
  receive a uniform resource locator (URL) which specifies a location of the semaphore, wherein URL is received in response to user input;
  communicatively couple to the computer memory using the URL;
  access the semaphore, wherein, in said accessing the semaphore, the first software component is further executable by the first processor to access the data comprised in the semaphore, wherein accessing the data comprised in the semaphore is performed irrespective of the first data type of the data comprised in the semaphore; and
  convert the data into a format useable by the first application.

23. The system of claim 22, further comprising:
 a network;
 wherein the first computer system is coupled to the network;
 wherein the computer memory is coupled to the network;
 wherein, in said accessing the semaphore, the first software component is further executable by the first processor to communicate through the network with the computer memory.

24. The system of claim 23, wherein the location is a network location of the network.

25. The system of claim 22, wherein, in converting the data, the first software component is further executable by the first processor to:
 convert the data comprised in the semaphore to a second data type, wherein the second data type is different from the first data type.

26. The system of claim 22, further comprising:
 a second computer system, wherein the second computer system comprises a second processor and a second memory medium, wherein the second processor is coupled to the second memory medium;
 wherein the second memory medium comprises a second software component, wherein the second software component is executable by the second processor to:
  access the semaphore, wherein, in said accessing the semaphore, the second software component is further executable by the second processor to access the data comprised in the semaphore, wherein accessing the data comprised in the semaphore is performed irrespective of the first data type of the data comprised in the semaphore.

27. A computer accessible memory medium comprising program instructions to access data from a semaphore, wherein the program instructions are executable by a processor to:
 receive a uniform resource locator (URL) which specifies a location of the semaphore, wherein URL is received in response to user input;

communicatively couple to a computer memory comprising a semaphore using the URL;
access the semaphore, wherein the semaphore is operable to store data of any of a plurality of different data types;
wherein the plurality of different data types comprise two or more of:
  WAV file;
  numeric;
  text;
  tabbed text file;
  DSD file;
  formatted vector;
  formatted array; or
  tab delimited spreadsheet data;
wherein, in said accessing the semaphore, the program instructions are further executable to access data comprised in the semaphore, wherein accessing the data comprised in the semaphore is performed irrespective of a data type of the data comprised in the semaphore;
convert the data into a format useable by an application stored in the memory medium.

28. The memory medium of claim 27,
wherein the location is a network location associated with a network;
wherein, in said accessing the semaphore, the program instructions are further executable to communicatively couple to the network location through the network.

29. The memory medium of claim 27, wherein, in converting the data, the program instructions are further executable to:
convert the data type of the data comprised in the semaphore to a different data type.

30. The memory medium of claim 27, wherein the program instructions are further executable to:
perform a locked read-modify-write operation on the data comprised in the semaphore.

31. The memory medium of claim 27,
wherein the format comprises the data comprised in the semaphore and at least one attribute associated with the data comprised in the semaphore.

* * * * *